(12) United States Patent
Becker et al.

(10) Patent No.: US 11,537,565 B2
(45) Date of Patent: Dec. 27, 2022

(54) LOCK MANAGEMENT ASSOCIATED WITH A KEY-VALUE DATABASE SYSTEM

(71) Applicant: Micron Technology, Inc., Boise, ID (US)

(72) Inventors: Gregory Alan Becker, Austin, TX (US); Neelima Premsankar, Austin, TX (US); David Boles, Austin, TX (US)

(73) Assignee: MICRON TECHNOLOGY, INC., Boise, ID (US)

( * ) Notice: Subject to any disclaimer, the term of this patent is extended or adjusted under 35 U.S.C. 154(b) by 153 days.

(21) Appl. No.: 16/912,168

(22) Filed: Jun. 25, 2020

(65) Prior Publication Data

US 2021/0200721 A1 Jul. 1, 2021

Related U.S. Application Data

(60) Provisional application No. 62/955,660, filed on Dec. 31, 2019.

(51) Int. Cl.
*G06F 16/176* (2019.01)
*G06F 16/22* (2019.01)
*G06F 16/17* (2019.01)
*G06F 16/18* (2019.01)

(52) U.S. Cl.
CPC ...... *G06F 16/1774* (2019.01); *G06F 16/1734* (2019.01); *G06F 16/1865* (2019.01); *G06F 16/2228* (2019.01)

(58) Field of Classification Search
CPC ............. G06F 16/1774; G06F 16/1865; G06F 16/2228; G06F 16/1734
See application file for complete search history.

(56) References Cited

U.S. PATENT DOCUMENTS 10,216,820 B1* 2/2019 Holenstein .......... G06F 16/1865
2007/0219998 A1* 9/2007 Lyle ....................... G06F 17/30

FOREIGN PATENT DOCUMENTS

AU 2016292786 B2 * 5/2019 ............. G06F 16/46

OTHER PUBLICATIONS

Jung et al. ("A Scalable Lock Manager for Multicores"; SIGMOD '13: Proceedings of the 2013 ACM SIGMOD International Conference on Management of Data; Jun. 2013 pp. 73-84) (Year: 2013).*

* cited by examiner

*Primary Examiner* — Irete F Ehichioya
*Assistant Examiner* — Ken Hoang
(74) *Attorney, Agent, or Firm* — Lowenstein Sandler LLP

(57) ABSTRACT

A first data structure lock to access a first data structure of a first set of data structures to perform an operation associated with a transaction is acquired. The operation associated with the transaction is executed, wherein the operation is one of inserting the transaction into the first data structure or removing the transaction from the first data structure. An oldest active transaction of the first data structure is identified. A globally oldest active transaction of the set of the data structures in view of the oldest active transaction is determined. A second set of data structures is accessed, the second set of data structures including information associated with completed transactions to identify a set of data locks associated with completed transactions each having a transaction completion identifier that satisfies a condition when compared to a transaction start identifier associated with the globally oldest active transaction. The set of data locks are released.

20 Claims, 7 Drawing Sheets

LOCK MANAGEMENT ASSOCIATED WITH A KEY-VALUE DATABASE SYSTEM

CROSS-REFERENCE TO RELATED APPLICATION

This application claims the benefit of U.S. Provisional Application No. 62/955,660, titled "Lock Management Associated with a Key-Value Database," filed Dec. 31, 2019, the entire disclosure of which is incorporated herein by reference.

TECHNICAL FIELD

The present disclosure generally relates to a memory sub-system, and more specifically, relates to lock management associated with a key-value database system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
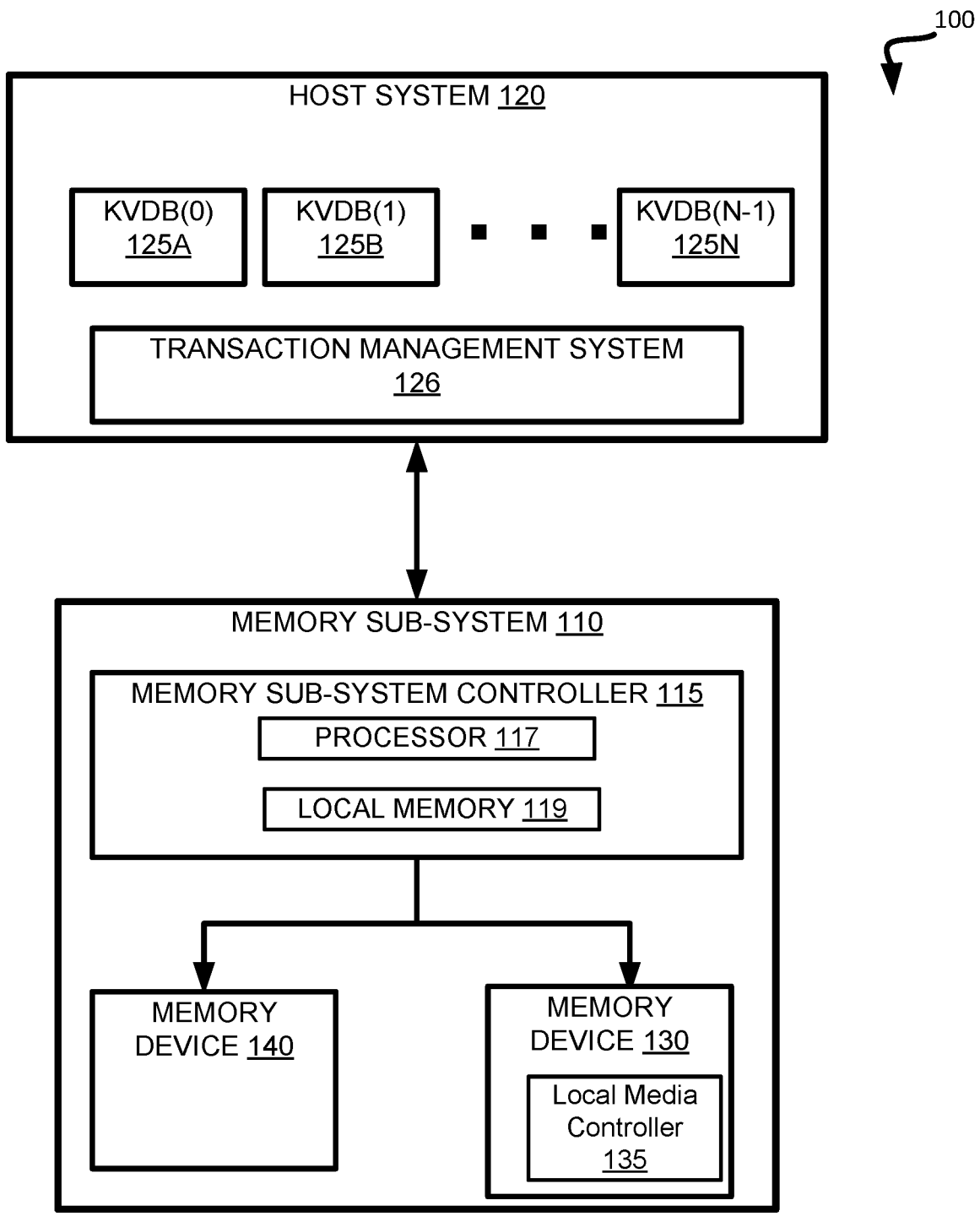
FIG. 1 illustrates an example computing system that includes a host system coupled with a memory sub-system in accordance with some embodiments of the present disclosure.

Aspects of the present disclosure are directed to managing locks in a storage architecture based on a type of non-relational database, such as a key-value database (KVDB). A KVDB is an instance of a collection of key-value sets (also known as a key-value store (KVS)) in a host system coupled to a memory sub-system. Each KVS can be a collection of keys and values. The KVS can be a tree of nodes, where each node contains a list of trees of key/value pairs. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

Key-value data structures accept a key-value pair (i.e., including a key and a value) and are configured for access by a host system thread to execute a change or mutation of a particular key (K) in the context of a transaction (T). Data structures used to manage key-value pairs may include dictionaries (e.g., maps, hash maps, etc.) and lists in which the key is stored that links (or contains) the respective value. These database systems provide application software a set of operations to store, retrieve, query, and transform data objects. Application software groups these operations into logical units referred to as "transactions".

Each key in the KVDB is associated with a lock that a client thread attempts to acquire in order to mutate it (e.g., as part of a transaction). In a KVDB, a memory location (e.g., volatile and/or non-volatile memory) can contain one or more versions of each key-value pair. If the lock is held by another transaction, then the mutation operation fails and the transaction is aborted. If the lock is not currently held, the transaction acquires the lock, the change is performed, and the corresponding change is visible to other client threads accessing the KVDB when the transaction commits.

Following the acquiring and holding of a lock in connection with a transaction, the lock is to be released. However, if a particular transaction commits, the lock cannot be released until every other transaction having a history which overlaps with the particular transaction has either committed or aborted (e.g., transactions T0 and T1 overlap with each other if T1 begins after T0 begins; and T1 begins before T0 commits or aborts). This places a significant burden on the system to manage and release locks held on behalf of previously-committed transactions in response to the committing or aborting of overlapping transactions. To do so, conventional systems employ various techniques to manage one or more searchable data structures including information identifying the locks that are currently held in connection with transactions being executed by one or more host system threads. The searchable data structure is itself protected by a lock (herein referred to as a "data structure lock") that needs to be acquired and held exclusively by a thread in order to access the data structure including the data lock information. However, the data structure lock protecting the searchable data structure of the lock manager is a highly contended system resource which can only be held by a single thread at a given time, thereby preventing concurrent threads of execution.

For example, a transaction can relate to the transfer of M dollars from bank account A to bank account B. In this example, the individual operations associated with this transaction can include: operation 1.) begin transaction; operation 2.) read the balance of account A as N dollars; operation 3.) read the balance of account B as P dollars; operation 4.) update the balance of account A to be N−M dollars; operation 5.) update the balance of account B to be P+M dollars; and operation 6.) commit transaction.

The aforementioned example operations can execute as if simultaneous. Accordingly, every transaction executes in temporal isolation from any other transaction—i.e., there is a single serial order in which the transactions occur, also referred to as "full serializability". This can be achieved by preventing overlapping transactions, greatly limiting concurrency and performance. Full serializability can also be achieved by conceptually locking and unlocking data objects in accordance with a complicated protocol, but the complexity of such a mechanism still substantially limits performance.

However, application software does not typically require full serializability for correct operation. A "weaker" or less stringent model can be employed, such as a "snapshot isolation" model. Snapshot isolation is achieved by acquiring and releasing conceptual locks associated with data objects, but it allows for more efficient implementation than full serializability. A given transaction T acquires a lock for every data object that it updates, resulting in a set of locks L(T) by the time T commits. The locks in L(T) must remain locked until every transaction whose execution overlapped with T's either commits or aborts. At that time, all of the locks in L(T) can be unlocked.

Aspects of the present disclosure address the above and other deficiencies by employing a transaction management system to employ a data structure and lock management processes to enable a high level of transaction concurrency and throughput. The transaction management system identifies and registers a unique sequence number corresponding to each instance of a host system thread starting execution of a transaction (e.g., a start sequence number). The transaction management system further identifies and registers a unique sequence number corresponding to a completion (e.g., commit or abort) of each transaction (e.g., a completion sequence number).

The transaction management system can maintain multiple data structures (e.g., multiple individual lists of transactions) to track and record the sequence numbers (e.g., the start sequence numbers and the completion sequence numbers) of each transaction in the system. For each of the respective lists (also referred to as "active transaction sets"), the transaction management system identifies an oldest active transaction.

Based on the identified oldest active transaction for each of the active transaction sets, the transaction management system can identify an overall or globally oldest active transaction associated with all of the lists (e.g., all of the different active transaction sets). The globally oldest active transaction information can be used to traverse a set of data structures (e.g., a set of buckets) to identify transactions that have completed (e.g., committed or aborted) and any subset of the locks held by a respective transaction during the execution of the transaction. The release of a set of data locks associated with a completed transaction is delayed until it is determined that the globally oldest active transaction started after the completed transaction committed (or aborted).

The transaction management system further manages the inheritance of one or more locks by a transaction. In an embodiment, the transaction management system tracks a completion time (e.g. a commit time or an abort time) for all transactions (and corresponding locks held by those transactions). The transaction management system enables one or more locks to be inherited by a transaction based on a comparison of the start time (e.g., the start sequence number) of that transaction and a completion time (e.g., the completion sequence number) of another transaction from which any subset of the are to be inherited. For example, if a transaction (T1) begins after another transaction (T0) commits, then T1 does not overlap with T0, and T1 can acquire any subset of the locks held by T0.

An advantage of the present disclosure is that the described transaction management system enables a more efficient searching, identifying, and releasing of data locks to promote a high level of transaction concurrency. The transaction management system of the present disclosure employs a scalable configuration of data structures which avoids having a lock manager with a single data structure protected by a single data structure lock. Advantageously, a high throughput of concurrently executing transactions is enabled using the lock retention, release and inheritance protocols described herein.

According to aspects of the present disclosure, a database system is managed to provide consistency guarantees to the application software according to a snapshot isolation model. According to embodiments, the locks can be conceptual in nature, such that the locks are an artifact of the database system's implementation providing consistency guarantees. In an embodiment, the system tracks an oldest currently executing transaction to enable the system to determine when to release locks held by previously committed transactions while still maintaining the guarantees of snapshot isolation.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAIVI), negative-or (NOR) flash memory, electrically erasable programmable read-only memory (EEPROM), and a cross-point array of non-volatile memory cells.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA) namespace) and a physical address and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The host system 120 includes one or more instances of KVDBs 125A to 125N. The host system 120 also includes a transaction management system 126 that can manage data structures relating to transactions associated with data stored in the KVDBs. The controller 115 can include a processor 117 (processing device) configured to execute instructions stored in local memory 119 for performing some of the operations described herein.

The transaction management system 126 assigns each transaction executed by an execution thread of the host system 120 a unique sequence number corresponding to a start of the transaction. The transaction and corresponding unique sequence number (also referred to as a "transaction start identifier", "start sequence number", or "view sequence number") is registered (e.g., inserted) in a data structure (e.g., an active transaction set). The transaction management system 126 maintains multiple different data structures (multiple active transaction sets) which are each associated with a respective data structure lock. In order to insert (or remove) a transaction to an active transaction set, the data structure lock (also referred to as a "mutex") corresponding to that active transaction set is acquired by the execution thread. In an embodiment, lock contention is distributed by employing multiple different active transaction sets each requiring the acquisition of a respective data structure lock by a thread to access the active transaction set.

The transaction management system 126 identifies and registers a unique sequence number corresponding to a completion (e.g., commit or abort) of a transaction (referred to as a "transaction completion sequence number") of an active transaction set. The transaction start identifiers and the transaction completion identifiers are unique sequence numbers and are used to order the start (e.g., the view sequence number) and the commit (e.g., the commit sequence number) in a time-ordered sequence.

The transaction management system 126 identifies an oldest active transaction (e.g., the active transaction having the lowest-value transaction start identifier of the active transaction listed in the active transaction set). In an embodiment, when a transaction is to be added or removed from the active transaction set, the corresponding thread acquires the data structure lock for that active transaction set to access the list to perform the add or remove operation.

Upon identification of the oldest active transaction for a particular active transaction set, the transaction management system 126 identifies an overall or globally oldest active transaction associated with all of the lists (e.g., all of the different active transaction sets). In an embodiment, the transaction management system 126 can acquire a global lock (also referred to as a "global view lock" or "min view lock") to access the other active transaction sets to identify the corresponding oldest active transaction in each set. The respective oldest active transactions from each of the multiple active transaction sets can then be compared to identify the globally oldest active transaction (e.g., the active (e.g., non-committed and non-aborted) transaction having the lowest or oldest active transaction start sequence number).

The transaction management system 126 can use the globally oldest active transaction information to compare to information stored in a separate set of data structures (e.g., a set of buckets) relating to completed transactions (herein referred to as the "lock data structures" or "buckets") including information relating to transactions that have completed (e.g., committed or aborted) and the corresponding one or more locks held by the respective completed transaction during the execution of those transactions. The transaction management system 126 can traverse the lock data structures to identify completed transactions that have a transaction completion identifier (e.g., a commit sequence number) that satisfies a condition when compared to a transaction start identifier (e.g., a view sequence number) associated with the globally oldest active transaction. In an embodiment, the condition is satisfied if the transaction completion identifier of a completed transaction is a lower value than the transaction start identifier of the globally oldest active transaction, indicating that the completed transaction either committed or aborted before the globally oldest active transaction started. When the condition is satisfied, the set of data locks associated with the completed transaction are safe to be released. In an embodiment, the release of set of data locks associated with completed transactions is delayed until it is determined that the globally oldest active transaction started after the completed transaction committed (or aborted).

In an embodiment, the lock data structures are logically arranged in a circular configuration, such that the transaction management system 126 can start traversal at any of the individual lock data structures and move to a next lock data structure in the circular configuration (e.g., moving in a clockwise direction). Each of the lock data structures is protected by a corresponding data structure lock or mutex that is acquired by a thread in order to access and traverse the lock data structure to identify lock sets to be released.

The transaction management system 126 manages the inheritance of one or more locks by a transaction. In an embodiment, the transaction management system tracks a completion time (e.g., a commit time or an abort time) for all transactions (and corresponding locks held by those transactions). The transaction management system enables one or more locks to be inherited by a transaction based on a comparison of the start time (e.g., the start sequence number) of that transaction and a completion time (e.g., the completion sequence number) of another transaction from which any subset of the locks are to be inherited. For example, if a transaction (T1) begins after another transaction (T0) commits, then T1 does not overlap with T0, and T1 can acquire any subset of the locks held by T0.

Figure 2:
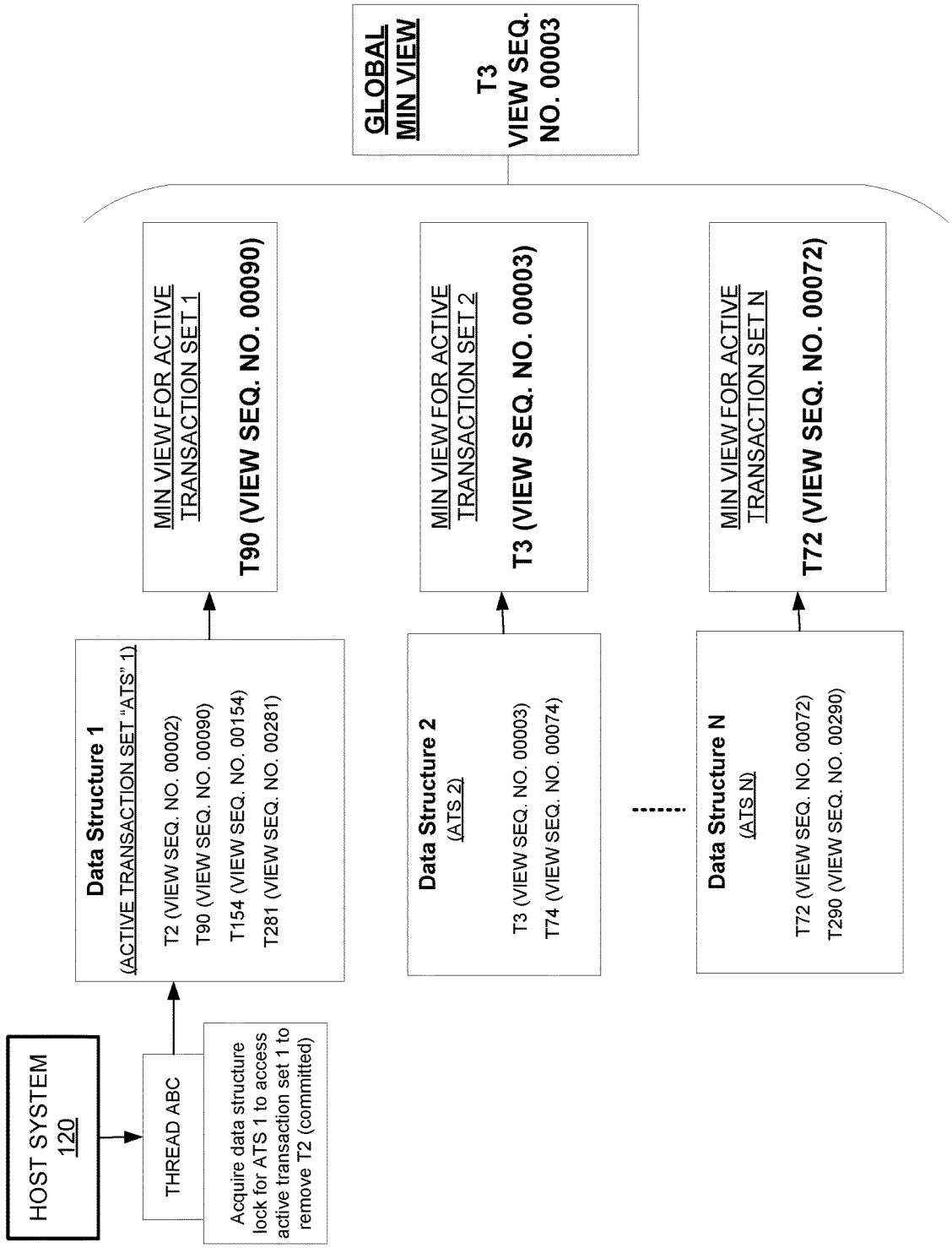
FIG. 2 illustrates management of multiple data structures to identify a globally oldest active transaction associated with a database system, in accordance with some embodiments of the present disclosure.

FIG. 2 illustrates management of multiple data structures (active transaction sets ("ATSs")) to identify a globally oldest active transaction associated with a KVDB (also referred to as a "database system"). FIG. 2 illustrates three particular instances of the active transaction sets (e.g., Data Structure 1, Data Structure 2, and Data Structure N), though the scope of the disclosure is not limited to any specific number of active transaction sets that can be managed by a transaction management system (e.g., transaction management system 126 of FIG. 1) of the present disclosure. Each of the active transaction sets includes a list of active transactions (e.g., transactions that have not been identified as committed or aborted) in the database system. The active transaction sets can be used by the transaction management system 126 to track and identify an oldest active transaction (referred to in FIG. 2 as a "min view") for each of the individual active transaction sets (e.g., a per-list oldest active transaction) and an overall or globally oldest active transaction (referred to in FIG. 2 as a "globally min view").

In an embodiment, the ATSs (e.g., ATS 1, ATS 2 . . . ATS N) can include a list of active transactions sorted by a corresponding transaction start identifier (e.g., a view sequence number) from lowest (e.g., oldest) to highest. In an embodiment, the transaction identifier is obtained by a transaction to establish its view sequence number before any mutations occur or locks are acquired. In an embodiment, the transaction start identifier is obtained by a transaction to establish its snapshot view of the KVDB prior to starting any operation (put, get or delete) in the context of the transaction. In an embodiment, the view sequence number can be established even if no mutations occur in the context of the transaction.

In an embodiment, an execution thread (e.g., Thread ABC) of a host system 120 designated to perform an operation associated with a transaction. In an embodiment the operation can be the inserting of a transaction to an ATS (e.g., in response to the start of a new transaction) or the removing of a transaction from the ATS (e.g., in response to a completion, such as a commit or abort, of a previously active transaction). To perform the operation, the thread acquires a data structure lock to gain access to the corresponding ATS. In an embodiment, the data structure selected to insert a new transaction is derived from a current CPU to enable distribution of lock contention across the multiple data structure locks protecting the respective ATSs.

In an embodiment, a transaction thread can access an ATS to perform one of the following operations: the transaction thread can insert a new transaction into an empty ATS, which results in an altering or changing of a min view for that ATS; the transaction thread can insert a new transaction into a non-empty ATS which can alter or change the min view for that ATS; or the transaction thread can remove a transaction from a non-empty ATS which can alter or change the min view for that ATS. In an embodiment, if any of these operations alters the globally min-view, then further processing will be performed.

In an embodiment, a transaction thread can access an ATS to insert a transaction into a non-empty ATS which does not alter the min view for that ATS. In this case, the transaction management process can end. For example, a thread performing an operation to insert transaction T74 on to ATS 2 can determine that the ATS includes an older transaction (e.g., T3). As such, the thread does not need to perform further processing after inserting T74 on to ATS 2. Similarly, a thread performing an operation to remove a transaction T290 from ATS N can determine that ATS N includes an older active transaction (e.g., T72). Accordingly, the thread does not need to perform further processing after removing T290 from ATS N.

In an embodiment, if the operation to be executed by the thread is the insertion of a new transaction on to an empty ATS (e.g., a list including no active transactions), or if the operation to be executed by the thread is the removal of an active transaction from a non-empty ATS, or if the operation to be executed by the thread is the insertion of a new transaction on to a non-empty ATS, the thread can perform further transaction management processing to determine if the particular transaction is the oldest active transaction of the ATS (e.g., the min view of the ATS), and if so, if the globally min view corresponding to all of the ATSs has been altered or updated.

In the example of the insertion of a new transaction on to an empty ATS, the thread identifies the inserted transaction as the oldest active transaction for that ATS (e.g., the min view for that ATS). The thread can then proceed to determine a globally oldest active transaction across all of the ATSs. In an embodiment, the thread can acquire a lock enabling access to the other ATSs (herein referred to as a "globally min view lock"). Using the globally min view lock, the thread can access the other ATSs, identify the min view for each of the respective ATSs (e.g., the per-ATS oldest active transaction) and compare those transactions to one another to identify the globally min view (e.g., the globally oldest active transaction).

In the example of the removal of an oldest active transaction from an ATS (as shown in FIG. 2), the thread acquires the data structure lock corresponding to the ATS in which the transaction is listed (as a then active transaction). The thread accesses the corresponding ATS using the data structure lock and determines if the transaction being removed is the oldest active transaction of that ATS. If so, the thread determines an updated or new oldest active transaction (e.g., the transaction having the lowest or oldest active transaction start identifier on the ATS after the removal of the transaction which was previously designated as the oldest active transaction). In an embodiment, if the transaction to be removed is not the oldest active transaction in the ATS, the transaction management processing can end.

In the example shown in FIG. 2, Thread ABC acquires the data structure lock for ATS 1 to access the data structure to perform a removal operation associated with transaction T2. In this example, the operation is the removal of T2 from ATS 1 in view of the completion (e.g., the commit) of transaction T2. As shown, since T2 was the previous oldest active transaction, Thread ABC determines an updated oldest active transaction for ATS 1. Upon removal of T2 from ATS 1, Thread ABC identifies T90 as the updated oldest active transaction for ATS 1. Thread ABC then acquires the min view lock to access the other ATSs (e.g., ATS 2 . . . ATS N) to compare T90 to the current min view of those other ATSs (e.g., T3 for ATS 2 and T72 for ATS N). In this example, Thread ABC identifies and designates T3 as the globally min view for the system. Thread ABC can then use the globally min view (e.g., T3) to identify set of data locks associated with completed transactions that are eligible for release, as described in greater detail with respect to FIGS. 4 and 5.

Figure 3:
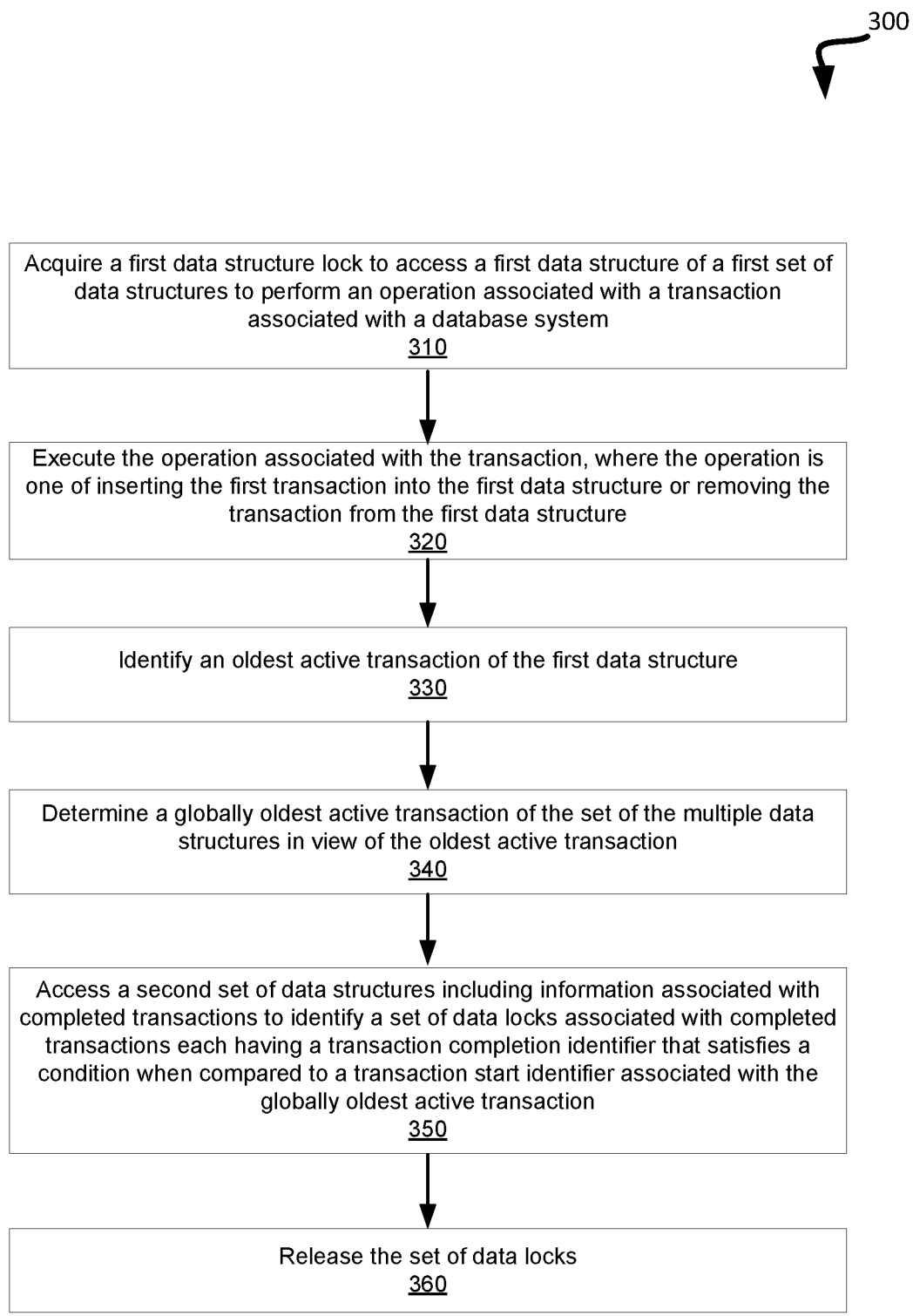
FIG. 3 is a flow diagram of an example method 300 of managing active transaction sets to identify a globally oldest active transaction, in accordance with some embodiments of the present disclosure.

FIG. 3 is a flow diagram of an example method 300 of managing active transaction sets to identify a globally oldest active transaction, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 can be performed by the transaction management system 126 of the host system 120 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic acquires a first data structure lock to access a first data structure of a first set of data structures to perform an operation associated with a transaction associated with a database system. In an embodiment, the first set of data structures or active transaction sets (e.g., ATS 1, ATS 2 . . . ATS N of FIG. 2) include multiple different lists of active transactions in a database system. In an embodiment, only a single execution thread can acquire the first data structure lock at a time.

At operation 320, the processing logic executes the operation associated with the transaction, where the operation is one of inserting the transaction into the first data structure or removing the transaction from the first data structure (i.e., when the transaction is the oldest active transaction on the ATS). In an embodiment, having gained access to the first data structure using the acquired lock, the processing logic executes the operation (e.g., either inserts or removes the transaction). In an embodiment, if the operation includes the insertion of the transaction beyond or after an older active transaction already in the first data structure, the processing logic and terminate method 300.

At operation 330, the processing logic identifies an oldest active transaction of the first data structure. In an embodiment, if the transaction is inserted into an empty first data structure, the processing logic identifies the transaction as the oldest active transaction (e.g., the min view for the corresponding ATS). In an embodiment, if the operation involves the removal of the transaction and the transaction was the current oldest active transaction in the first data structure, the processing logic identifies an updated or next oldest active transaction (e.g., after the removal of the transaction) and designates that transaction as the oldest active transaction. For example, as shown in FIG. 2, for the operation involving the removal of T2 from ATS 1, the processing logic identifies T90 as the next oldest active transaction listed in ATS 1, and designates T90 as the oldest active transaction (e.g., the min view for the corresponding ATS).

At operation 340, the processing logic determines a globally oldest active transaction of the set of the multiple data structures in view of the oldest active transaction. In an embodiment, having identified the oldest active transaction for the first data structure, the processing logic can acquire a lock (e.g., the min view lock) to access the other data structures of the first set of data structures. In the example shown in FIG. 2, the processing logic uses the min view lock to access ATS 2 . . . ATS N to identify the respective oldest active transactions listed in each of those data structures. Using the view sequence numbers and commit sequence numbers corresponding to each respective transaction, the transaction management system can track an oldest active transaction in the system and use this information to traverse data structures including data lock information (i.e., a lock manager) on behalf of completed (e.g., committed or aborted) transactions to identify data locks that are eligible for release. The transaction management system also executes an inheritance protocol to enable a data lock to be inherited or acquired by a transaction from another non-overlapping transaction.

In an embodiment, the processing logic may not perform operation 340 (e.g., the processing logic does not acquire the min view lock) if the processing logic determines the globally min view sequence number (the current oldest active transaction) is greater than the transaction start identifier of the transaction being removed, which can occur due to thread scheduling.

At operation 350, the processing logic accesses a second set of data structures including information associated with completed transactions to identify a set of data locks associated with completed transactions each having a transaction completion identifier that satisfies a condition when compared to a transaction start identifier associated with the globally oldest active transaction. In an embodiment, the second set of data structures (also referred to as "lock data structures", as shown and described in detail with respect to FIGS. 4 and 5) lists expired or completed transactions that are holding a set of data locks that are eligible for release. In an embodiment, the second set of data structures is traversed in response to determining the globally min view sequence number changed as a result of removing a transaction from the ATS. In an embodiment, the second set of data structures is traversed to potentially free up or release lock sets if the globally min view sequence number changes.

In an embodiment, the transactions listed in each of the lock data structures of the second set of data structures is associated with a transaction completion identifier (e.g., a commit sequence number). In an embodiment, the processing logic determines that the condition is satisfied if a commit sequence number associated with a transaction listed in the lock data structure is lower than the view sequence number of the globally oldest active transaction. In an embodiment, satisfaction of the condition indicates that the completed transaction committed (or aborted) prior to the start of the globally oldest active transaction, and as a result the two transactions do not overlap, and the set of data locks associated with the completed transaction can be released. In an embodiment, the lock sets represent a list of all of the locks held by a transaction during the execution of the transaction. When a transaction completes (aborts or commits), the lock set is placed or inserted in a lock data structure of the second set of data structures. In an embodiment, the transactions and corresponding lock set(s) of the lock data structure can be sorted by the commit sequence number (lowest to highest).

Figure 4:
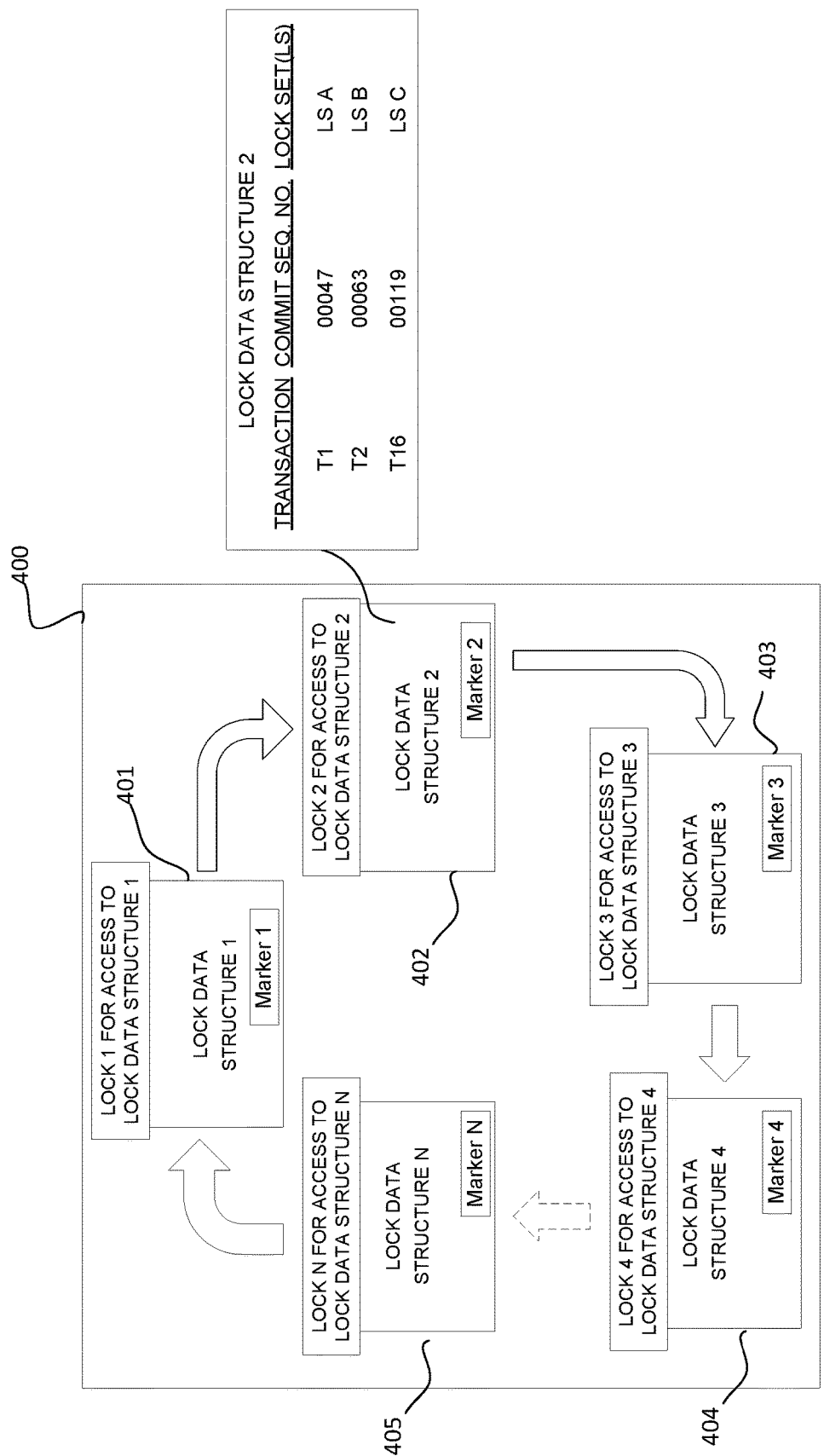
FIG. 4 illustrates an example set of lock data structures employed by a transaction management system 126 to identify and release eligible lock sets associated with a database system.

In an embodiment, the processing logic acquires a lock (i.e., a data structure lock or mutex) corresponding to each of the second set of data structures in order to access the information contained in those data structures to determine which lock sets can be released. In an embodiment, the second set of data structures are arranged in a circular configuration (as shown in FIG. 4), such that the processing logic can initiate operation 350 at any of the lock data structures of the second set of data structures to ameliorate lock contention associated with the data structure locks corresponding to the respective lock data structures. In an embodiment, the processing logic can move from one lock data structure to another lock data structure in the second set of data structures (e.g., in a clockwise manner) and acquire the corresponding data structure lock for each to perform the traversal of the second set of data structures in operation 350. In an embodiment, the processing logic may search and traverse a portion of the lock data structures of the second set of data structures, as described in greater detail below.

At operation 360, the processing logic releases the set of data locks. In an embodiment, the set of data locks identified in operation 350 can be collected by the processing logic and released upon completion of the traversal of the second set of data structures.

FIG. 4 illustrates an example set 400 of multiple lock data structures 401-405 (e.g., the second set of data structures described above in connection with FIG. 3) employed by a transaction management system 126 to identify and release eligible lock sets associated with a KVDB. As shown in FIG. 4, the lock data structures 401-405 can be arranged in a circular configuration, such that a thread performing a lock release process (e.g., method 500 shown in FIG. 5) can initiate a traversal of the multiple lock data structure by starting in any of the respective lock data structure and moving clockwise to a next lock data structure (e.g., moving from 402 to 403), as indicated by the arrows shown in FIG. 4. In an embodiment, to access a respective lock data structure, the thread acquires a corresponding data structure lock (e.g., Lock 1 is acquired by a thread to access lock data structure 1).

Each lock data structure 401-405 of the set of lock data structures 400 includes information identifying completed transactions (e.g., transactions that committed or aborted) and associated lock set information held by each transaction. In an embodiment, the lock data structure can list the completed transactions in order of a corresponding commit sequence number, from lowest to highest). For example, contents of lock data structure 2 include a list of completed transactions (e.g., T1, T2, and T16), a corresponding commit sequence number, and associated lock sets held by each transaction. As shown, T1 has the lowest commit sequence number (00047), followed by T2 (00063) and T16 (00119).

In an embodiment, upon accessing a respective lock data structure, the thread traverses the list of transactions (starting with the lowest commit sequence number) and uses the globally oldest active transaction (e.g., as identified in FIG. 3) to determine if the set of data locks (e.g., LS A, LS B, and LS C) can be released. In an embodiment, the thread compares the transaction start identifier associated with the globally oldest active transaction (i.e., the globally min view sequence number) to the commit sequence number associated with a transaction listed in the lock data structure (e.g., T1) to determine if a condition is satisfied. In an embodiment, the condition is satisfied if the commit sequence number is lower than the globally min view sequence number, indicating that the completed transaction (e.g., T1) committed before the start of the globally oldest active transaction. If the condition is satisfied, the thread determines that the corresponding lock sets (e.g., LS A) can be released.

In an embodiment, the thread may not traverse an entire list of transaction in a lock data structure. For example, once a thread identifies a lock data structure that contains no lock sets that can be released, the thread can terminate the search. In another example, the thread can terminate the traversal of a particular lock data structure upon identifying a transaction that does not satisfy the condition (e.g., has a commit sequence number that is higher than the globally min view sequence number).

In an embodiment, each lock data structure is associated with a marker (e.g., Marker 1, Marker 2, Marker 3, Marker 4 . . . Marker N). The marker represents the last or most recently used "globally min view sequence number" used to traverse that particular lock data structure (e.g., during a previous iteration of the lock release process by another thread). In an embodiment, prior to traversal of a lock data structure, a thread can compare the current globally min view sequence (e.g., the min view sequence number that the thread plans to use to traverse the lock data structure) with the marker. In an embodiment, if the marker value is higher than the min view sequence number the thread plans on applying, then the thread can terminate traversal of the set of lock data structures 400. In an embodiment, a lock data structure that has a marker value with a higher value than the globally min view sequence number held by the thread indicates that that lock data structure has previously been traversed and associated lock sets have already been released using a newer min view sequence number.

For example, if the globally min view sequence number to be applied by the thread is 00058 and the corresponding marker for lock data structure 2 (Marker 2) is 00009, the thread accesses the lock data structure to determine if any lock sets can be released. In this example, during traversal of the list of completed transactions in lock data structure 2, the thread compares the globally min view sequence number (00058) to the commit sequence number of T1 (00047) and determines that T1 satisfies the condition (e.g., T1 committed before the globally oldest active transaction started). Accordingly, the thread proceeds with the release of LS A. Continuing on the list, the thread compares the globally min view sequence number (00058) to the commit sequence number of T2 (00063) and determines that T2 does not satisfies the condition, and terminates traversal of lock data structure 2.

In an example, if the thread continues to traverse the set of lock data structures and encounter lock data structure 4 having a marker value of 00061, the thread can terminate processing since lock data structure 4 has already been traversed using a higher (e.g., newer) min view sequence number.

Figure 5:
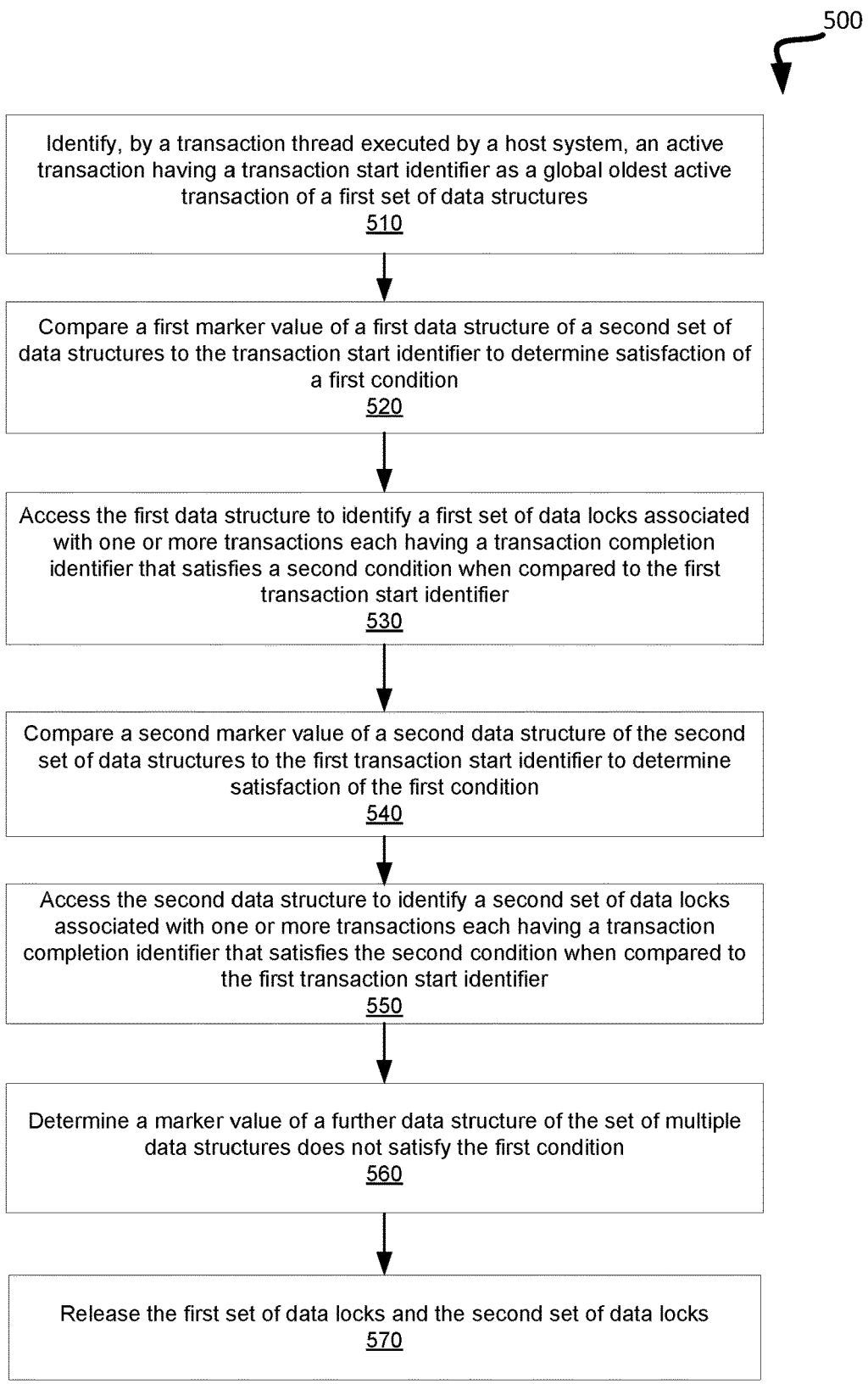
FIG. 5 is a flow diagram of an example method 500 of managing a set of lock data structures to identify set of data locks to release, in accordance with some embodiments of the present disclosure.

FIG. 5 is a flow diagram of an example method 500 of managing a set of lock data structures to identify a set of data locks to release, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 can be performed by the transaction management system 126 of the host system 120 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic identifies an active transaction having a transaction start identifier as a globally oldest active transaction of a first set of data structures. In an embodiment, the globally oldest active transaction (e.g., the transaction having the globally min view sequence number) can be identified by a thread according to the process described above in connection with FIGS. 2 and 3. In an embodiment, the first set of multiple data structures refers to the active transaction sets, as shown in FIG. 2.

At operation 520, the processing logic compare a first marker value of a first data structure of a second set of data structures to the transaction start identifier to determine satisfaction of a first condition. In an embodiment, the second set of data structures refers to the lock data structures, as shown in FIG. 4. As described above, the marker value associated with the first data structure represents the previous "globally min view sequence number" that was used to traverse the first data structure during a previous iteration of the lock release process by another thread. In an embodiment, the first condition is satisfied if the marker value is less than the transaction start identifier of the globally oldest active transaction. If the first condition is satisfied, the method 500 continues to operation 530.

At operation 530, the processing logic accesses the first data structure to identify a first set of data locks associated with one or more transactions each having a transaction completion identifier that satisfies a second condition when compared to the transaction start identifier. In an embodiment, the thread acquires a lock associated with the first data structure to gain access to the lock data structure. In an embodiment, the thread compares the transaction start identifier (the globally min view sequence number) to the transaction completion identifier (the commit sequence number) of a transaction listed in the first data structure and determines if the second condition is satisfied. The second condition is satisfied if the transaction completion identifier is less than the transaction start identifier. If the second condition is satisfied, the thread identifies the first set of data locks associated with the completed transaction and determines that those locks can be released. In an embodiment, the processing logic updates the marker value for the first data structure of the second set of data structures to reflect or identify the transaction start identifier.

At operation 540, the processing logic compares a second marker value of a second data structure of the second set of data structures to the transaction start identifier to determine satisfaction of the first condition. In an embodiment, the second data structure is a next lock data structure in the circular configuration as the thread moves in a clockwise direction between the multiple lock data structures, as shown in FIG. 4. In an embodiment, the thread moves to a second data structure of the circular arrangement of data structures (e.g., moving in a clockwise manner) and repeats the steps and functions of operation 520.

At operation 550, the processing logic accesses the second data structure to identify a second set of data locks associated with one or more transactions each having a transaction completion identifier that satisfies the second condition when compared to the transaction start identifier. In an embodiment, to access the second data structure, the thread acquires a lock configured to enable access to the second data structure. It is noted that operations 540 and 550 can be repeated iteratively as the thread moves among the multiple lock data structures within the second set of data structures (e.g., lock data structure 1 through N of FIG. 4).

At operation 560, the processing logic determines a marker value of a further data structure of the set of multiple data structures does not satisfy the second condition. In an embodiment, the second condition is not satisfied if the marker value associated with the further data structure is higher than the transaction start identifier of the globally oldest active transaction. In this case, the thread determines that the further data structure has already been traversed by another thread using a newer min view sequence number as part of a prior iteration of the lock release process. In an embodiment, if the first condition is not satisfied, the method 500 proceeds to operation 570.

At operation 570, the processing logic releases the first set of data locks (identified in operation 530) and the second set of data locks (identified in operation 550). In an embodiment, the processing logic releases all sets of locks identified during the traversal of the multiple lock data structures of the set of lock data structures.

Figure 6:
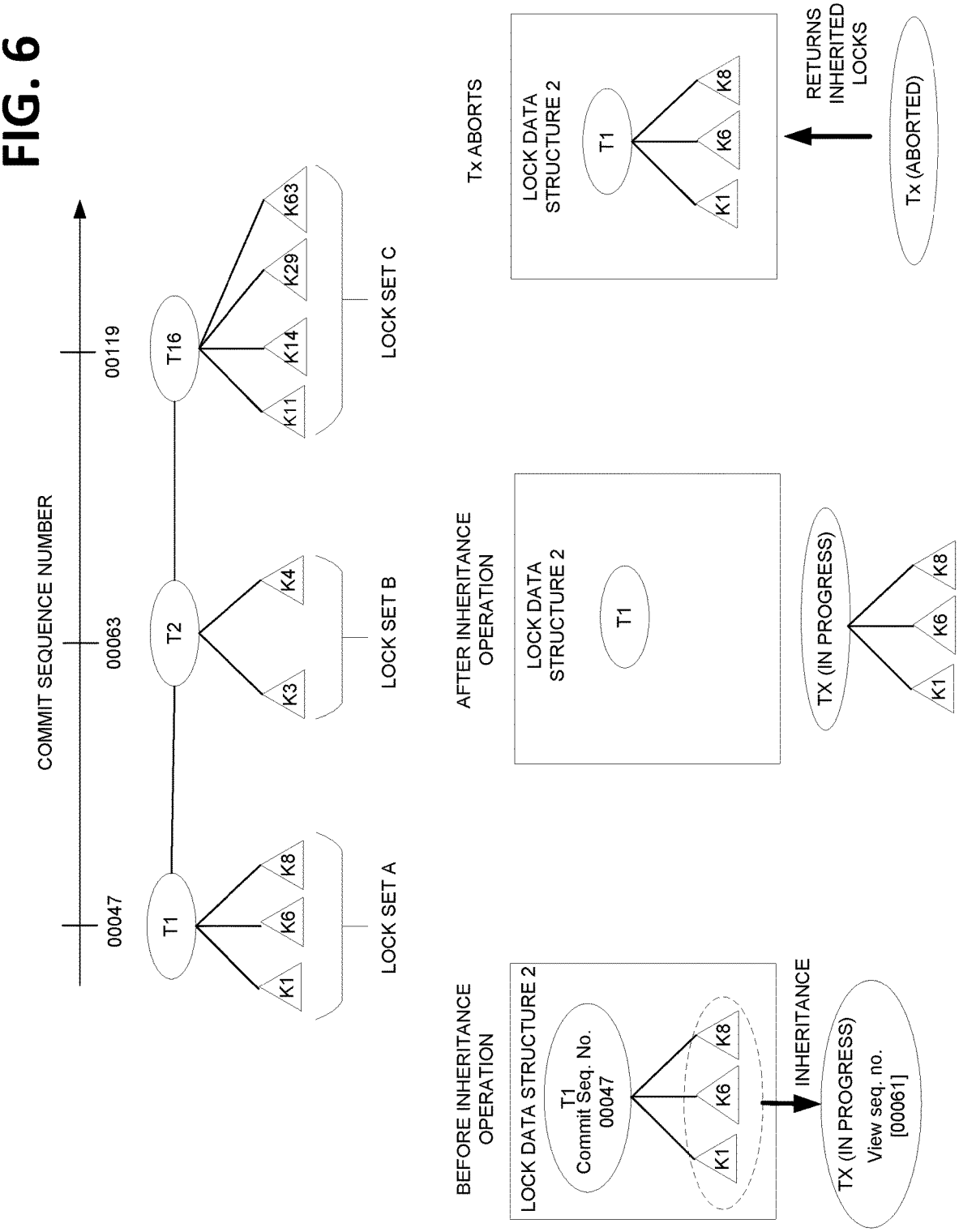
FIG. 6 illustrates an example of lock inheritance processing performed by a transaction management system, in accordance with some embodiments of the present disclosure.

FIG. 6 illustrates an example of lock inheritance processing performed by a transaction management system, in accordance with embodiments of the present disclosure. The example shown relates to lock data structure 2 of FIG. 4. As shown, a thread can traverse lock data structure 2 to identify transactions T1, T2, and T16 having commit sequence numbers in ascending order (e.g., 00047, 00063, and 00119, respectively). The transactions are associated with lock sets (T1 is associated with lock set A, T2 is associated with lock set B, and T19 is associated with lock set C) which include the locks held by the respective transactions.

In an embodiment, the transaction management system performs a lock inheritance process to enable a transaction to inherit one or more locks from another transaction. In an embodiment, a timeline is illustrated which shows T1 of lock structure 2. The respective locks are associated with the commit sequence number of the transaction that successfully acquired the lock. When a transaction Tx attempts to acquire a lock that is currently held by another transaction (T1), the view sequence number of Tx is compared to the commit sequence number of T1. If T1 has a commit sequence number that is greater than the view sequence number of Tx (or T1 has not yet committed), overlap is detected and Tx fails to inherit any subset of the from T1. In an embodiment, if the commit sequence number of T1 is less than the view sequence number of Tx (i.e., Tx started after T1 committed), Tx inherits any subset of the from T1.

As shown in FIG. 6, before execution of an inheritance operation, T1 holds the locks K1, K6, and K8 and has a commit sequence number of 00047. Transaction Tx is started and acquires a view sequence number of [00061] and attempts to acquire locks K1, K6, and K8 during execution. In an embodiment, the thread executing Tx compares the commit sequence number of T1 (00047) to the view sequence number of Tx (000061). Based on the comparison, the thread determines that commit sequence number of T1 (00047) is less than the view sequence number of Tx (000061). Accordingly, the thread determines that Tx can inherit the locks from T1. The inheritance operation is executed and Tx inherits K1, K6, and K8 from T1, as shown in FIG. 6.

In an embodiment, following the inheritance operation, the transaction management system may determine that Tx aborted. Since Tx inherited locks from another transaction, when Tx aborts, the inherited locks are returned to the transaction from which the locks were inherited (T1). In an embodiment, an indication identifying a source of inherited locks (e.g., the transaction from which one or more locks were inherited) is tracked with respect to the transaction that inherited any subset of the. In the example shown in FIG. 6, Tx stores an indication identifying T1, since Tx inherited locks from T1. If Tx later aborts, the indication is used to identify T1, and the inherited locks (K1, K6, and K8) are returned to the source transaction T1. In an embodiment, any locks inherited by Tx are managed as if those locks had been acquired by Tx through the normal acquisition process (e.g., as if those locks were not inherited from T1). For example, if Tx acquires a lock (e.g., K7), an entry on the second set of data structures (lock data structure 2) can include K1, K6, K7, and K8 with the start and finish sequence numbers associated with Tx.

Figure 7:
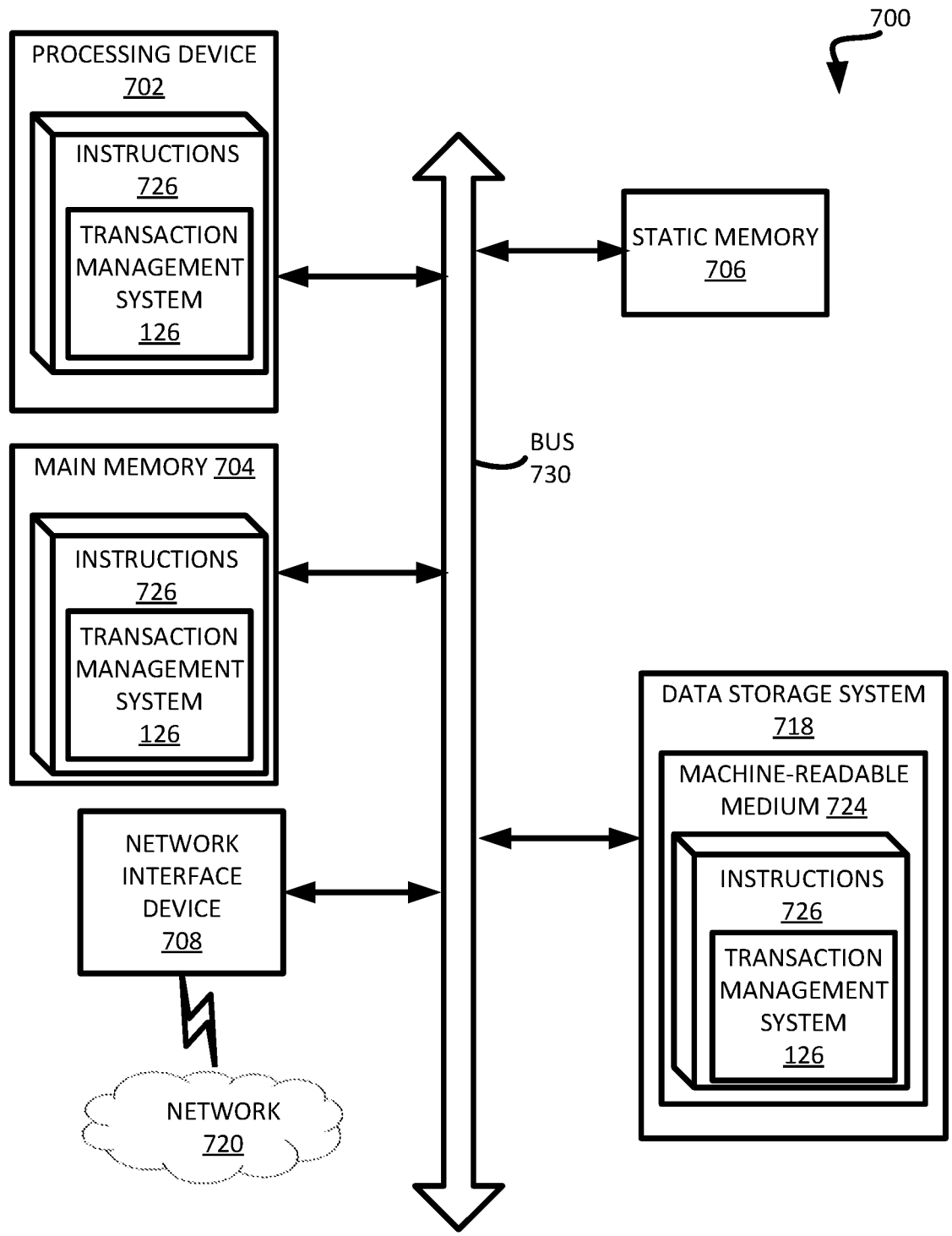
FIG. 7 is a block diagram of an example computer system in which implementations of the present disclosure can operate.

FIG. 7 illustrates an example machine of a computer system 700 within which a set of instructions, for causing the machine to perform any one or more of the methodologies discussed herein, can be executed. For example, the computer system 700 can correspond to a host system (e.g., the host system 120 of FIG. 1) that includes, is coupled to, or utilizes a memory sub-system (e.g., the host system 110 of FIG. 1) or can be used to perform the operations of a controller (e.g., to execute an operating system to perform operations corresponding to the transaction management system 126 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720. The data storage device 718 can include a machine-readable storage medium 724 (also known as a computer-readable medium) on which is stored one or more sets of instructions or software 726 embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one implementation, the instructions 726 include instructions to implement functionality corresponding to a specific component (e.g., transaction management system 126 of FIG. 1). While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "servicing" or "issuing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   acquiring a first data structure lock to access a first data structure of a first set of data structures to perform an operation associated with a transaction;
   executing the operation associated with the transaction, where the operation is one of inserting the transaction into the first data structure or removing the transaction from the first data structure;
   identifying an oldest active transaction of the first data structure;
   acquiring a global lock to access a remainder of the first set of data structures;
   using the global lock to access the remainder of the first set of data structures to determine a globally oldest active transaction of the first set of the data structures in view of the oldest active transaction;
   accessing a second set of data structures including information associated with completed transactions to identify a set of data locks associated with completed transactions each having a transaction completion identifier that satisfies a condition when compared to a transaction start identifier associated with the globally oldest active transaction; and
   releasing, by a processing device, the set of data locks.

2. The method of claim 1, wherein each data structure of the first set of data structures comprises a list of active transactions associated with a database system.

3. The method of claim 2, wherein each active transaction is associated with an atomically increasing transaction start identifier.

4. The method of claim 1, wherein the operation comprises inserting the transaction into the first data structure, and wherein the first data structure is empty.

5. The method of claim 1, wherein an oldest active transaction is identified for each data structure of the first set of data structures.

6. The method of claim 5, wherein determining the globally oldest active transaction further comprises:
   comparing a plurality of transaction start identifiers each associated with an oldest active transaction identified for each data structure of the first set of data structures; and
   identifying the globally oldest active transaction having a lowest transaction start identifier of the plurality of transaction start identifiers.

7. The method of claim 1, wherein the condition is satisfied when the transaction start identifier associated with the globally oldest active transaction is greater than a transaction completion identifier associated with a completed transaction stored in the second set of data structures.

8. A system comprising:
   a plurality of memory components; and
   a processing device, operatively coupled to the memory components, to perform operations comprising:
   acquiring, by a transaction thread executed by a host system, a global lock to access a first set of data structures;
   using the global lock to access the first set of data structures;
   identifying, by the transaction thread, an active transaction having a transaction start identifier as a globally oldest active transaction associated with the first set of data structures;
   comparing a first marker value of a first data structure of a second set of data structures to the transaction start identifier to determine satisfaction of a first condition;
   accessing the first data structure to identify a first set of data locks associated with one or more transactions each having a transaction completion identifier that satisfies a second condition when compared to the transaction start identifier; and
   releasing the first set of data locks.

9. The system of claim 8, wherein the first condition is satisfied when the first marker value is lower than the transaction start identifier.

10. The system of claim 8, wherein the second set of data structures comprises a plurality of lock data structures comprising listings of completed transactions and associated lock information.

11. The system of claim 10, wherein the processing device is further to perform operations comprising acquiring a first lock to gain access to the first data structure.

12. The system of claim 11, wherein the processing device is further to perform operations comprising:
   comparing a second marker value of a second data structure of the second set of data structures to the transaction start identifier to determine satisfaction of the first condition.

13. The system of claim 12, wherein the processing device is further to perform operations comprising traversing the second data structure to identify a second set of data locks associated with one or more transactions each having a transaction completion identifier that satisfies the second condition when compared to the transaction start identifier.

14. The system of claim 13, wherein the processing device is further to perform operations comprising releasing the second set of data locks.

15. The system of claim 13, wherein the processing device is further to perform operations comprising:
   determining a marker value of a further data structure of the second set of data structures does not satisfy the first condition, wherein a further lock corresponding to the further data structure is not acquired by the transaction thread.

16. The system of claim 8, wherein the processing device is further to perform operations comprising:
   identifying an additional transaction thread seeking to acquire a set of data locks from a first completed transaction;

determining the additional transaction is associated with a transaction start identifier that is higher than a transaction completion identifier of the first completed transaction; and executing an inheritance operation to enable the additional transaction to acquire the set of data locks from the first completed transaction.

17. The system of claim 16, wherein the processing device is further to perform operations comprising:

determining the additional transaction aborted; and executing an operation to return the set of data locks to the first completed transaction.

18. A non-transitory computer readable medium comprising instructions, which when executed by a processor, cause the processor to perform operations comprising:

acquiring a first data structure lock to access a first data structure of a first set of data structures to perform an operation associated with a transaction;

executing the operation associated with the transaction, where the operation is one of inserting the transaction into the first data structure or removing the transaction from the first data structure;

identifying an oldest active transaction of the first data structure;

acquiring a global lock to access a remainder of the first set of data structures;

using the global lock to access the remainder of the first set of data structures to determine a globally oldest active transaction of the first set of the data structures in view of the oldest active transaction;

accessing a second set of data structures including information associated with completed transactions to identify a set of data locks associated with completed transactions each having a transaction completion identifier that satisfies a condition when compared to a transaction start identifier associated with the globally oldest active transaction; and releasing, by a processing device, the set of data locks.

19. The non-transitory computer readable medium of claim 18, wherein an oldest active transaction is identified for each data structure of the first set of data structures.

20. The non-transitory computer readable medium of claim 18, wherein determining the globally oldest active transaction further comprises:

comparing a plurality of transaction start identifiers each associated with an oldest active transaction identified for each data structure of the first set of data structures; and identifying the globally oldest active transaction having a lowest transaction start identifier of the plurality of transaction start identifiers.

\* \* \* \* \*